March 30, 1965 W. J. GREINER 3,175,880
CHEMICAL RECOVERY BY ION EXCLUSION FROM NEUTRAL
SULFITE SEMICHEMICAL SPENT LIQUOR
Filed Sept. 19, 1962
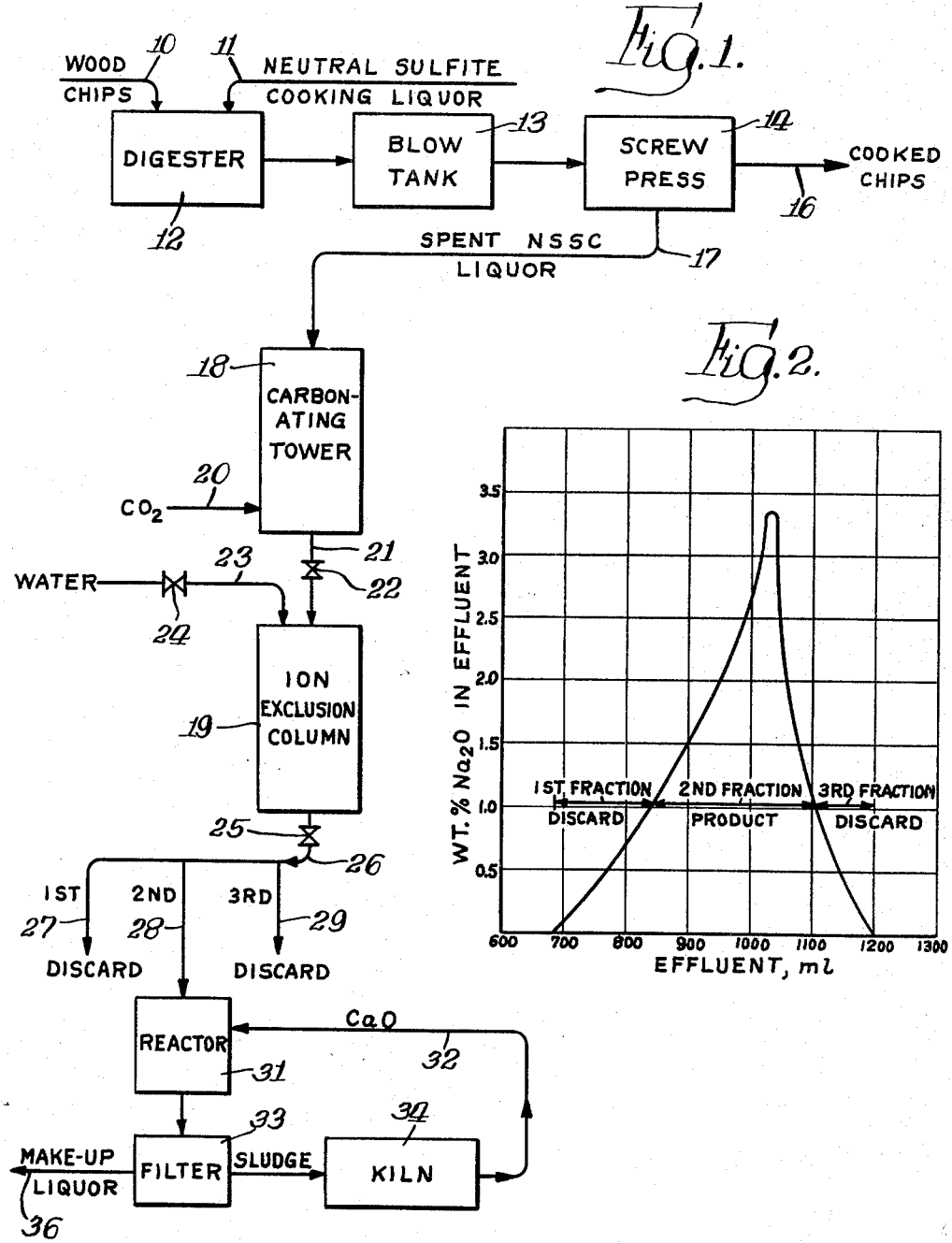
INVENTOR.
William J. Greiner
BY
Hibben, Noyes & Bicknell
Atty's.

3,175,880
CHEMICAL RECOVERY BY ION EXCLUSION FROM NEUTRAL SULFITE SEMICHEMICAL SPENT LIQUOR
William J. Greiner, Fort Madison, Iowa, assignor, by mesne assignments, to Consolidated Paper Company, Chicago, Ill., a corporation of Michigan
Filed Sept. 19, 1962, Ser. No. 224,704
17 Claims. (Cl. 23—49)

This invention relates to improvements in the recovery of chemical values from neutral sulfite waste pulping liquor. More particularly, the invention relates to a novel and improved process for recovering sodium values from neutral sulfite semichemical spent liquor.

In the production of paper pulp the so-called neutral sulfite cooking liquors are desirable from the standpoint of relatively high yields from the wood or other cellulosic source material and the production of a good grade of pulp. They are particularly useful in the pulping of hard woods.

One commonly used method of employing a neutral sulfite liquor is the semichemical process (known as the NSSC process) wherein the pulp is formed by cooking the wood chips or other raw material in a sodium base neutral sulfite liquor (containing sodium sulfite and/or sodium bisulfite and sodium carbonate and/or sodium bicarbonate) and thereafter converting the partially cooked material into a usable pulp by physical means, such as by a mechanical disintegrator or the like. In the cooking step partial removal of lignin is effected, and separation of the fiber is completed in the mechanical step. A typical neutral sulfite liquor for semichemical pulping may comprise (based on the weight of dry wood) from about 8% to about 20% sodium sulfite and from about 2% to about 6% sodium carbonate with a pH from about 8 to about 10.

After the cooking step, the cooked chips are separated from the liquor and washed. The spent liquor and concentrated wash water are combined and the resultant material is known in the trade as neutral sulfite waste or spent liquor. It contains most of the chemicals, solubilized lignin, and other wood components, but because of its organic content it is for the most part not reusable.

In spite of the advantages recognized by the industry for the neutral sulfite semichemical process, the cost of semichemical pulp is frequently excessively high in the absence of a suitable recovery method for the chemicals used, particularly the sodium compounds. In addition, pulp mills are faced with increasing restrictions regarding waste disposal. Various proposals have been made for recovering sodium from waste sulfite liquors, but most of these proposals involve costly combustion, oxidation, or evaporation steps which do not solve the economic problem and do not lend themselves to use in medium or small pulp mills. In the literature, certain proposals have been made to utilize ion exchange methods for chemical recovery from waste sulfite liquor, but such processes involve serious process difficulties and require frequent regeneration of the ion exchange material.

Accordingly, a primary object of the present invention is to provide a novel and improved process for the recovery of valuable chemicals from waste sulfite liquor which overcomes the disadvantages of previously known methods.

A more particular object of the invention is to provide a novel and improved process for recovering sodium values from neutral sulfite semichemical spent liquor.

Another object of the invention is to provide a novel and improved chemical recovery process of the aforementioned character which is relatively simple and inexpensive and is readily adapted for use in small or medium size pulp mills.

A more specific object of the invention is to provide a novel and improved method of utilizing ion exchange materials in the recovery of sodium from neutral sulfite semichemical spent liquor which is economical to operate and does not require regeneration of the ion exchange material.

Other objects and advantages of the invention will become apparent from the subsequent detailed description in conjunction with the accompanying drawings wherein:

FIG. 1 is a schematic flow sheet illustrating one specific embodiment of the process; and FIG. 2 is a graph of experimental data showing the recovery of sodium values in accordance with the invention.

Briefly described, the invention is based on my discovery that the sodium values can be effectively separated from the lignin components of spent NSSC liquor by means of the ion exclusion method which differs significantly from conventional ion exchange methods. The process of the invention comprises a preliminary carbonation treatment of the neutral sulfite semichemical spent liquor followed by ion exclusion separation and recovery of sodium-containing fractions. The separated sodium-containing fractions may then be treated, e.g., with a soluble calcium compound, to precipitate small amounts of lignin not removed in the ion exclusion separation step, whereby a substantially lignin-free regenerated liquor is obtained which is suitable for reuse in the pulping process.

The invention will best be understood by reference to FIG. 1 of the drawings which comprises a schematic flow diagram of the process. The pulping steps are shown in simplified form. Thus, wood chips and a sodium base neutral sulfite cooking liquor are introduced at 10 and 11 to a digester 12. The contents of the digester 12 pass to a blow tank 13 where steam is separated, and the cooked chips then pass to a screw press 14 where the cooked chips are washed and separated at 16 from the neutral sulfite semichemical spent liquor which is removed at 17. Obviously, other pulping arrangements can be used which are well known in the neutral sulfite semichemical pulping art.

The spent NSSC liquor removed at 17 contains water, sodium sulfite, sodium carbonate and/or bicarbonate, and soluble lignin constituents probably in the form of sodium lignosulfonate. In addition, other soluble wood components and small amounts of sodium bisulfite and sodium sulfate may also be present. The spent liquor is on the alkaline side, e.g., a pH of from about 8.0 to about 9.5 or sometimes higher dependent upon the amount of sodium carbonate in the original cooking liquor. The spent liquor will usually have a total solids content of from about 175 g./l. to about 250 g./l.

In accordance with the invention, it has been found that it is essential to subject the spent liquor to a carbonation treatment prior to the ion exclusion separation. Otherwise, proper separation of the sodium salts from the lignin compounds is not obtained in the subsequent ion exclusion step. The reasons for this requirement are not fully understood, but it is believed that the carbonation treatment has a favorable effect on the lignin components of the spent liquor which causes them to be more readily separable from the sodium content of the liquor in the ion exclusion step. This phenomenon may be due, at least in part, to the lowering of the pH of the spent liquor as a result of carbonation, but other chemical effects may also be responsible for the observed result.

As shown in FIG. 1, the spent NSSC liquor passes through the line 17 to the upper portion of a packed carbonating tower 18, and carbon dioxide gas is introduced at 20 to the bottom of the tower 18 for countercurrent contact with the downwardly flowing liquor. For economic reasons, ordinary flue gas is preferably utilized as the carbon dioxide source, but it will be understood that commercial grades of straight carbon dioxide or other carbon dioxide-containing gases may also be used. The carbonation step is carried out at atmospheric pressure and at the normal temperature of the spent liquor as it comes from the pulping operation, e.g., from about 60° C. to about 80° C. Somewhat higher temperatures and pressures may be employed, but in no event should the temperature and pressure conditions be severe enough to cause lignin precipitation. Thus, the carbonated liquor from the tower 18 can be supplied to the subsequent ion exclusion separation step without filtering. The contact time in the carbonating tower 18 should be sufficient so that the liquor is substantially saturated with $CO_2$ and so that the pH of the spent liquor is reduced to within the range of from about 7.0 to about 7.5. As previously indicated, the spent NSSC liquor as introduced to the tower 18 is on the alkaline side, e.g., a pH of from about 8.0 to about 9.5 or even higher.

Following the carbonation treatment in the tower 18, the liquor is then processed in accordance with the ion exclusion technique to effect separation of sodium compounds from the lignin components of the liquor. The ion exclusion technique is a relatively recent development in the use of ion exchange resins and is to be distinguished from the more conventional uses of ion exchange resins wherein the resin bed must be regenerated frequently. Reference is made to W. C. Bauman U.S. Patent No. 2,684,331, issued July 20, 1954, and to the article by R. M. Wheaton and W. C. Bauman appearing in Industrial and Engineering Chemistry, vol. 45, pp. 228–233 (January 1953), for a complete discussion of the principles involved in the ion exclusion method.

Briefly, the ion exclusion method is applicable to a solution of two or more solutes having widely different ionization constants, at least one of the solutes undergoing considerable ionization in dilute aqueous solution. The solution containing the less ionized and the more extensively ionized solutes is passed through a bed of an ion exchange resin in the same ionic form as the more extensively ionized solute. The less ionized solute is selectively retained or adsorbed by the resin and the more extensively ionized solute is repelled or excluded by the resin so that when wash water is subsequently passed through the bed the more extensively ionized solute is eluted selectively and can be recovered as a dilute aqueous fraction. Continued elution with wash water allows the less ionized solute to be displaced from the resin and recovered in a successive effluent fraction. Hence, a separation of the solutes is readily effected and the resin bed does not require regeneration as in the conventional use of ion exchange resins wherein a net exchange of ions occurs between the feed solution and the resin.

As shown in FIG. 1, a bed of granular ion exchange resin is contained in a vessel or column 19 and the carbonated liquor from the tower 18 is introduced at the top of the column 19 through a line 21 having a control valve 22. A line 23 having a control valve 24 is also provided for introducing water at the top of the column 19. The flow of liquid through the column 19 may be in any direction but downward flow, as shown in FIG. 1 is preferred.

To begin the operation, the bed of resin in column 19 is first flooded with water from the line 23 until the resin bed is fully immersed in water. Then the valve 24 is closed and the valve 22 is opened to feed a controlled volume of the carbonated liquor, having an adjusted pH of from about 7.0 to about 7.5, into the bed so as to displace approximately an equal volume of water therefrom. Upon contact with the resin, the less highly ionized or non-ionized lignin components of the feed liquor apparently diffuse into the resin granules and are retained in and around the granules whereas the more highly ionized sodium compounds remain unadsorbed and can readily be flushed through the void spaces of the bed. The valve 22 is now closed and the valve 24 is opened to elute the bed with water. The initial effluent portion comprising the water initially supplied to cover the bed is discarded. Thereafter, the unadsorbed or excluded sodium compounds are flushed from the bed and are recovered in the subsequent aqueous fractions. Upon continued flushing with water, the less highly ionized or non-ionized lignin components are eluted and are recovered in successive effluent aqueous fractions.

As shown in FIG. 1 by way of illustration, the eluted aqueous fractions are removed from the bottom of the column 19 through a line 26 having a valve 25. The first sodium-containing fraction comprising only small amounts of sodium compounds may be discarded, at at 27. The second or intermediate fraction containing most of the eluted sodium compounds is recovered, as at 28. The third or final fraction containing only minor amounts of sodium compounds is discarded, as at 29. Obviously, any desired number of fractions may be separated and the split between the recovered and discarded fractions will be determined by economic considerations.

Continued flushing of the resin bed with water results in the elution of the lignin components which may be discarded or used for other purposes. The bed is then ready for a repetition of the above-described cycle by feeding successive volumes of carbonated liquor and wash water. It will be appreciated that by a suitable level control system, time-controlled valve arrangement, or other instrumentation the process can be operated in a semi-continuous manner using a single ion exclusion column. Alternatively, a plurality of ion exclusion columns can be used to obtain a substantially continuous operation in a manner well known to those skilled in the art.

The second or intermediate sodium-containing fraction removed at 28 will usually contain about 60% (as $Na_2O$) of the recoverable sodium. However, the separation achieved by ion exclusion is not complete and this fraction will therefore contain a minor amount of lignin components. In general, it will be desirable to remove such minor amounts of lignin by further treatment so as to obtain a substantially lignin-free sodium-containing liquor suitable for reuse as make-up liquor in the preparation of fresh cooking liquor for the pulping process.

Lignin removal from the fraction removed at 28 may be effected most conveniently by treating the recovered fraction in any suitable manner to precipitate the lignin components. For example, the recovered fraction may be reacted with calcium oxide (lime) or a soluble calcium compound to precipitate the lignin components as calcium lignosulfonate which may be separated from the fraction by settling and/or filtration. Thus, in FIG. 1, the fraction removed at 28 is introduced into a reaction zone 31 to which lime or calcium oxide is also introduced through line 32. The precipitated calcium lignosulfonate is separated in a filtration zone 33 in the form of a sludge which may then be oxidized in a kiln 34 or the like to obtain calcium oxide for recycling to the reaction zone 31 through the line 32. The filtrate comprising a dilute aqueous solution of sodium compounds substantially free of lignin components is recovered at 36 and may be concentrated for use as make-up liquor in the preparation of fresh neutral sulfite semichemical cooking liquor.

For maximum recovery of sodium values, the first and second sodium-containing fractions removed at 27 and 28 may be combined before treatment with lime to remove residual amounts of lignin. In this event, about 85% (as $Na_2O$) of the available sodium is recovered. However, if the first fraction is to be discarded, as described above, it may be desirable to precipitate residual lignin by treatment with lime or the like so as to permit disposal of the fraction without objectionable stream pollution. Instead of discarding the first fraction, it may also be utilized for by-product purposes, such as a road binder.

The third fraction removed at 29 will generally contain less than 10% sodium (as $Na_2O$) which is not economical to recover.

The resin employed in the ion exclusion column 19 should be the sodium form of a suitable cation exchange resin. The sulfonated polystyrene resins with from about 4% to about 12% cross linkage (preferably 4% to 8%) known as Dowex 50 (Dow Chemical Co.) are particularly well suited for purposes of the present invention. More specifically, excellent results have been obtained with Dowex 50-X4, sodium form, 50-100 mesh size. Other commercial brands of this type of resin which may be used include Duolite C-20, sodium form, 50-100 mesh size (Chemical Process Co.) and Amberlite IR-120, sodium form, 50-100 mesh size (Rohm & Haas Co.). However, other types of cation exchange resins in sodium form may also be used as the sulfonated phenol-formaldehyde resins and the carboxylic acid resins.

The mesh or particle size of the resin granules should be small enough to favor rapid attainment of equilibrium in the ion exclusion column but not so small as to increase the pressure drop through the bed excessively. In general, a particle size of 50-100 mesh (U.S. Standard Screen) is preferred.

The flow rate through the resin bed may vary from about 0.5 to about 2.0 gal./min./sq. ft. In each successive batch fed to the ion exclusion column the feed volume of carbonated liquor should be less than the void volume of the resin bed, i.e., less than the volume of water initially added to immerse the bed, in order to insure the desired sharp separation between eluted fractions. For example, the feed volume may range from about 20% to about 30% of the resin bed volume when using Dowex 50-X4, sodium form, 50-100 mesh wherein the void volume is about 33% of the resin bed volume. The amount of rinse water used to elute the bed should be substantially greater than the feed volume, e.g., a ratio of rinse water volume to feed volume of from about 2:1 to about 4:1 may be used. The ion exclusion column is operated at substantially atmospheric pressure, and the carbonated liquor is fed to the column at its normal temperature as it leaves the carbonating tower. The general relationship between the aforementioned variables is discussed in the article by Wheaton and Bauman previously referred to.

For purposes of further illustrating the invention, but not by way of limitation, the following specific example is given.

*Example*

A glass column having a length of 48 inches and a diameter of 2 inches was loaded with 1000 ml. of the sodium form of a sulfonated polystyrene cation exchange resin, Dowex 50-X4, sodium form, 50-100 mesh. The void volume of the bed was approximately 330 ml. or 33% of the bed volume. The resin bed in the column was filled with water.

A volume of about 200 ml. of spent neutral sulfite semichemical liquor was then fed to the top of the column thereby displacing most of the initial water content of the column. Thereafter, a wash water volume of about 800 ml. was fed to the top of the column and the effluent fractions were collected in 100 ml. increments. The flow rate of both feed liquor and wash water was maintained at about 0.5 gal./min./sq. ft.

The results of the elution are shown graphically in FIG. 2 in which the volume of effluent is plotted against wt. percent $Na_2O$ as determined in the effluent. As shown in FIG. 2, approximately the first 700 ml. of effluent from the column, including the initially displaced water, was discarded. The first collected fraction comprising the portion from about 700 ml. to about 840 ml. was discarded. The second collected fraction comprising the portion from about 840 ml. to about 1100 ml. and containing the bulk of the sodium values was saved. The third collected fraction from about 1100 ml. to about 1200 ml. was discarded.

The first and second fractions were treated with calcium oxide to precipitate small amounts of lignin which were not separated in the ion exclusion column. The spent liquor fed to the column and the first and second fractions, both before and after treatment with calcium oxide, were analyzed according to Institute Method No. 108 by TAPPI. The results of the analyses were as follows:

| Spent liquor: | G./l. |
|---|---|
| Total solids | 194.40 |
| Total $Na_2O$ | 59.24 |
| Organic matter | 134.47 |
| Inorganic matter | 1.91 |
| Fraction 1 before treating with CaO: | |
| Total solids | 52.93 |
| Total $Na_2O$ | 14.96 |
| Organic matter | 33.27 |
| Inorganic matter | 0.36 |
| Fraction 1 after treating with CaO: | |
| Total solids | 27.92 |
| Total $Na_2O$ | 14.53 |
| Organic matter | 13.32 |
| Inorganic matter | 0.26 |
| Fraction 2 before treating with CaO: | |
| Total solids | 71.64 |
| Total $Na_2O$ | 34.65 |
| Organic matter | 40.94 |
| Inorganic matter | 0.32 |
| Fraction 2 after treating with CaO: | |
| Total solids | 28.52 |
| Total $Na_2O$ | 34.56 |
| Organic matter | 16.25 |
| Inorganic matter | 0.23 |

From the foregoing data it will be seen that approximately 59% of the sodium values were recovered in the second fraction. A comparison of the analyses before and after treatment with calcium oxide shows a marked decrease in total solids and organic matter with $Na_2O$ remaining about the same, thereby demonstrating removal of lignin.

I claim:

1. A process for recovering sodium values from spent neutral sulfite semichemical liquor which comprises the steps of carbonating the spent liquor, feeding the carbonated liquor to a water-immersed bed of cation exchange resin in sodium form whereby to effect retention by the resin of the lignin components of the liquor, feeding water to the bed to elute unretained sodium compounds, and recovering an aqueous sodium-containing fraction.

2. A process for recovering sodium values from spent sodium base neutral sulfite semichemical liquor which comprises the steps of carbonating the spent liquor and thereby lowering the pH of the liquor, feeding the carbonated liquor to a water-immersed bed of cation exchange resin in sodium form, whereby to effect retention by the resin of the lignin components of the liquor, feeding water to the bed to elute unretained sodium compounds and recovering an aqueous sodium-containing fraction.

3. The process of claim 2 further characterized in that said liquor is contacted with carbon dioxide gas in said carbonating step under conditions sufficient to substantially saturate the liquor with carbon dioxide and lower the pH thereof to from about 7.0 to about 7.5.

4. The process of claim 2 further characterized in that said resin comprises a sulfonated polystyrene resin.

5. The process of claim 2 further characterized in that said resin comprises a sulfonated polystyrene resin having from about 4% to about 12% cross linkage.

6. The process of claim 2 further characterized in that said recovered aqueous sodium-containing fraction is further treated to precipitate out residual amounts of lignin components, whereby to obtain a substantially lignin-free fraction.

7. The process of claim 6 further characterized in that residual lignin components are precipitated from said fraction by reaction with a calcium compound.

8. The process of claim 7 further characterized in that said calcium compound comprises calcium oxide.

9. A process for recovering sodium values from spent sodium base neutral sulfite semichemical liquor which comprises the steps of contacting said liquor having a pH substantially on the alkaline side with carbon dioxide gas until the pH is lowered to from about 7.0 to about 7.5, feeding the carbonated liquor to a water-immersed bed of cation exchange resin in sodium form thereby displacing water from the bed and effecting selective retention by the resin of the lignin components of the liquor, thereafter feeding sufficient wash water to the bed to elute unretained sodium compounds from the resin bed, and recovering a dilute aqueous sodium-containing fraction.

10. The process of claim 9 further characterized in that said liquor is substantially saturated with carbon dioxide in said carbonating step without effecting precipitation of lignin components.

11. The process of claim 9 further characterized in that said resin comprises a sulfonated polystyrene resin.

12. The process of claim 9 further characterized in that said resin comprises a sulfonated polystyrene resin having from about 4% to about 12% cross linkage.

13. The process of claim 12 further characterized in that said resin has from about 4% to about 8% cross linkage.

14. The process of claim 9 further characterized in that the flow rate through said resin bed is from about 0.5 to about 2.0 gal./min./sq. ft. and the volume ratio of wash water to carbonated liquor fed to the bed is from about 2:1 to about 4:1.

15. A process for recovering sodium values from spent sodium base neutral sulfite semichemical liquor which comprises the steps of contacting said liquor having a pH substantially on the alkaline side with carbon dioxide gas until the pH is lowered to from about 7.0 to about 7.5, feeding the carbonated liquor to a water-immersed bed of cation exchange resin in sodium form thereby displacing water from the bed and effecting selective retention by the resin of the lignin components of the liquor, thereafter feeding sufficient wash water to the bed to elute unretained sodium compounds from the resin bed, recovering a dilute aqueous sodium-containing fraction, and treating said fraction to precipitate out residual amounts of lignin components, whereby to obtain a substantially lignin-free fraction.

16. The process of claim 15 further characterized in that residual lignin components are precipitated from said fraction by reaction with a calcium compound.

17. The process of claim 16 further characterized in that said calcium compound comprises calcium oxide.

References Cited by the Examiner
UNITED STATES PATENTS

| | | | |
|---|---|---|---|
| 2,684,331 | 7/54 | Bauman | 260—637 X |
| 2,710,254 | 6/55 | Van Blaricom et al. | 162—16 |
| 2,736,635 | 2/56 | Haywood | 23—129 |

MAURICE A. BRINDISI, *Primary Examiner.*

BENJAMIN HENKIN, *Examiner.*